H. R. EASTERLING.
Improvement in Gin Gearing.
No. 123,248. Patented Jan. 30, 1872.
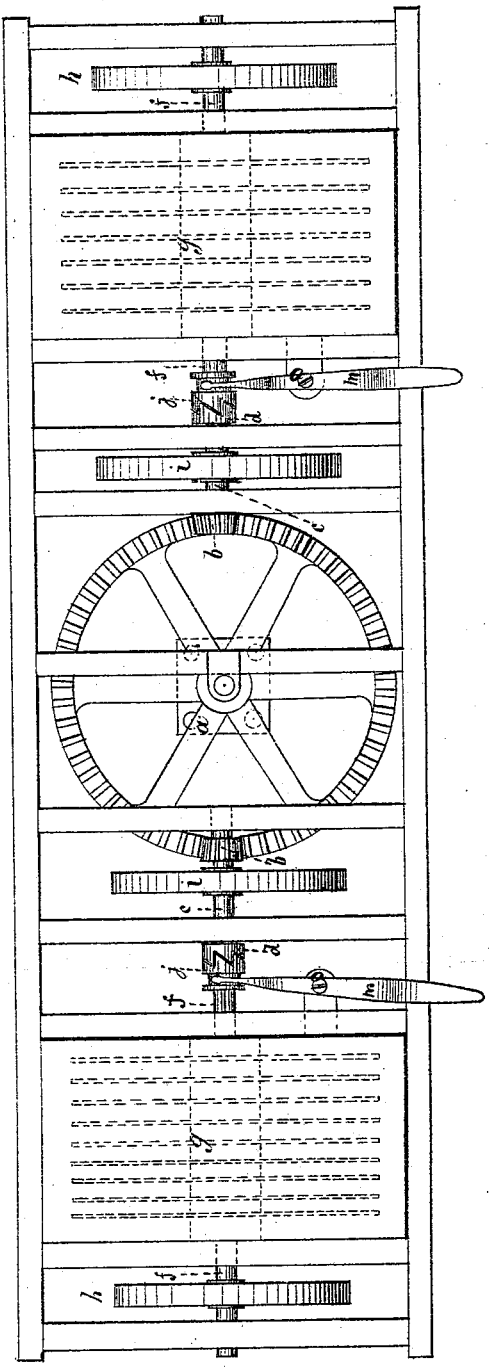
Witnesses:
G. Mathys.
Thos. D. D. Durand
Inventor:
H. R. Easterling.
per [signature]
Attorneys.

123,248

UNITED STATES PATENT OFFICE.

HARRIS R. EASTERLING, OF BENNETTSVILLE, SOUTH CAROLINA.

IMPROVEMENT IN GIN-GEARINGS.

Specification forming part of Letters Patent No. 123,248, dated January 30, 1872.

Specification describing certain Improvements in Gin-Gearing, invented by HARRIS R. EASTERLING, M. D., of Bennettsville, in the county of Marlborough and State of South Carolina.

The figure is a plan view.

This invention relates to the combination of two gins placed diametrically opposite each other, and gearing with a master-wheel driven by horse or other power, the connection between said gins and the pinions that gear with the master-wheel being effected by means of sliding clutches, so that either gin may be stopped without stopping the other gin or the master-wheel.

Referring to the drawing, $a$ is the master-wheel aforesaid, driven by horse or other power. Gearing with this wheel at diametrically opposite points are pinions $b$, of the proper pitch, said pinions being placed upon shafts $c$ properly mounted in boxes. On each of these shafts is secured a head, $d$, with recesses in its outer end. The gin-shafts $f$ are placed in line with the shafts $c$, said shafts $f$ bearing saws $g$, (shown in dotted lines,) fly-wheels $h$ and $i$, and splines, which enter grooves in clutches $j$ that slide on the shafts $f$, being worked by means of forked levers $m$ fitting circumferential grooves in the clutches $j$, and pivoted at $o$, so that by a lateral movement of the lever at its outer end the clutches $j$ will be moved lengthwise along the shafts $f$, and either thrown into gear with the recesses in the ends of the heads $d$, in which case the gin-saws are revolved when the master-wheel $a$ is revolved, or thrown out of gear with the heads $d$, in which case the gin-saws stop, whether the master-wheel stops or not. It is obvious that the clutches $j$ can be worked independently of each other, so that the stopping of one does not necessitate the stopping of the other.

Having thus described my invention, what I claim as new, and desire to secure by Letters Patent, is—

The master-wheel $a$ combined with pinions $b$, shafts $c$, heads $d$, gin-shafts $f$, clutches $j$, and levers $m$, all as specified.

HARRIS R. EASTERLING, M. D.

Witnesses:
 SOLON C. KEMON,
 THOS. D. D. OURAND.